No. 641,181. Patented Jan. 9, 1900.
J. W. BATES.
AUTOMATIC COUPLING FOR AIR PUMPS.
(Application filed Feb. 21, 1896.)

(No Model.)

Witnesses:
C. E. Van Dorn.
B. P. Shepherd.

Inventor:
Joseph W. Bates.
By Paul & Hawley
his Attorneys.

UNITED STATES PATENT OFFICE.

JOSEPH W. BATES, OF MINNEAPOLIS, MINNESOTA, ASSIGNOR, BY DIRECT AND MESNE ASSIGNMENTS, TO CARLOSTINE E. BLAKE AND ALFRED CARLSON, OF SAME PLACE.

AUTOMATIC COUPLING FOR AIR-PUMPS.

SPECIFICATION forming part of Letters Patent No. 641,181, dated January 9, 1900.

Application filed February 21, 1896. Serial No. 580,156. (No model.)

*To all whom it may concern:*

Be it known that I, JOSEPH W. BATES, of the city of Minneapolis, county of Hennepin, State of Minnesota, have invented certain new and useful Improvements in Automatic Couplings for Air-Pumps, of which the following is a specification.

The object of this invention is to provide an automatic pump-barrel which may be applied to any air-pump for the purpose of making automatically a tight joint between the exit pipe, tube, or hose of the pump and the nipple of the receptacle into which the air is to be forced. I design the device especially for use with air-pumps for inflating the pneumatic tires of bicycles or other vehicles, but it may with equal advantage be used where air or other gaseous substance is to be forced into any other receptacle.

The invention consists generally in a pump-barrel provided in its discharge-orifice with a flexible clamp that is adapted to be forced closely by the pressure of the air about the nipple or stem of the pneumatic tire or other device that is to be inflated.

The invention consists, further, in the constructions and combinations hereinafter described, and particularly pointed out in the claims.

The invention will be more readily understood by reference to the accompanying drawings, forming part of this specification, and in which—

Figure 2:
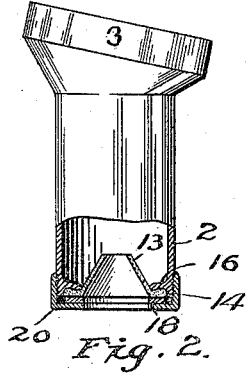
Figure 1:
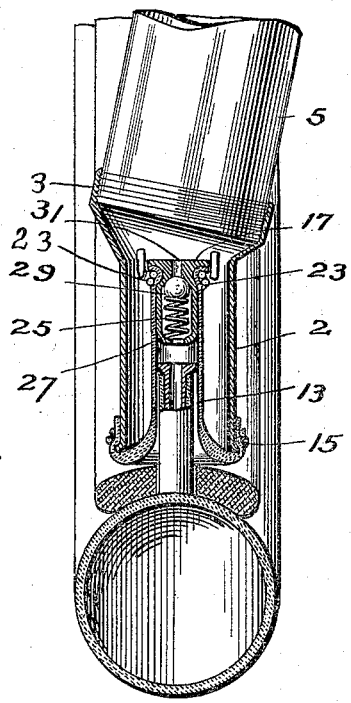
Figure 3:
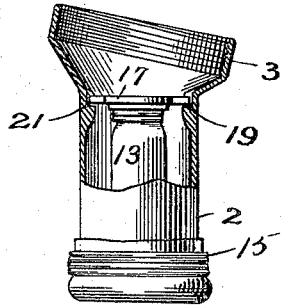
Figure 5:
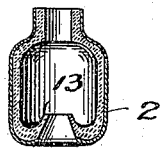
Figure 4:
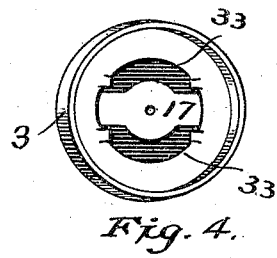
Figure 6:
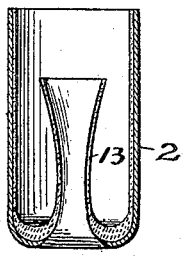
Figure 7:
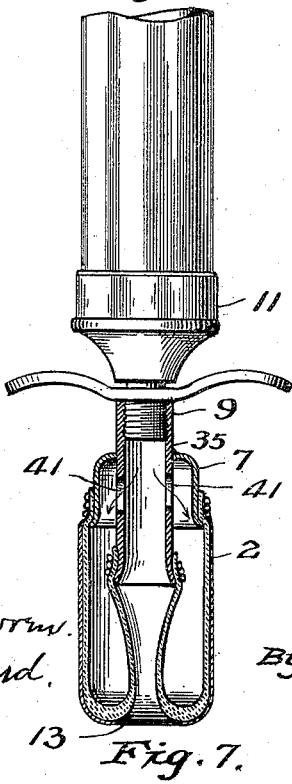
Figure 8:
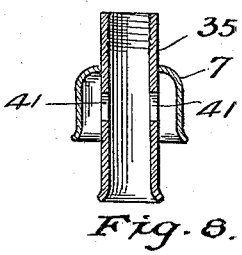

Figure 1 is a sectional elevation of one form of my improved coupling, showing it applied to the nipple of a pneumatic tire. Fig. 2 is an elevation, partly in section, showing another form of the device. Fig. 3 is an elevation and partial section of the device, taken on a plane at right angles to that of Fig. 1. Fig. 4 is a plan view of the construction shown in Fig. 3. Fig. 5 is a modified form of the elastic clamp. Fig. 6 is a detail showing another form of the clamp. Fig. 7 is a vertical section showing one form of the device as applied to the ordinary hand-pump. Fig. 8 is a detail showing the metal stem of the clamp shown in Fig. 7.

In all of the drawings, 2 represents a suitable shell, which is arranged to be secured by suitable means to the end of the exit pipe, tube, or hose of a suitable air-pump. This shell is preferably formed of some practically inelastic material, such as metal, cloth, canvas, leather, &c.

In Figs. 1, 2, and 3 I have shown a shell formed of metal and having a flaring upper end 3, provided with a suitable screw-thread and adapted to be screwed onto the end of a tube 5. The tube 5 may be, if preferred, the cylinder of the air-pump, in which case the shell 2 will form the end of the air-pump itself. In other constructions, as in Fig. 7, the shell 2 may be secured to a suitable metal ring or tube 7, that is adapted to be screwed into the threaded nozzle 9 of an air-pump 11. Secured to or formed integrally with the lower end of the shell 2 is an elastic wall or annular clamping-shell 13. The device is so arranged that the clamping-shell 13 is slipped over the nipple or stem, and the air being forced into the space between the inelastic outer wall or shell 2 and the elastic inner wall or shell 13 will cause said elastic wall to be forced closely around the outer surface of said nipple or stem, thereby forming a tight joint between the two surfaces.

In Figs. 1 and 3 I have shown the elastic wall 13 secured to the lower end of the outer wall or shell 2 by being drawn over the lower end of said shell 2 and secured thereto by a suitable wire or cord 15. In this instance the upper end of the inner wall or shell 13 is secured to a valve-plate 17, as shown in Figs. 1 and 3, said valve-plate having its ends 19 resting upon or secured to the shell 2, preferably being supported upon suitable shoulders 21 upon the inner surface of said shell. The end of the flexible shell 13 is preferably secured upon said valve-plate by a suitable wire or cord 23. The valve-plate 17, as here shown, is provided with a valve-chamber 25, having therein a spring 27 and a ball-valve 29. This valve fits against the opening 31 in said plate. The lower end of the chamber is also provided with an opening, and, as shown in Fig. 1, the valve is normally held against the under side of said opening 31 by the spring 27, and said valve prevents the air from passing backward through said valve-plate into the pump. This device will be useful when the coupling is used in connection with tires that are provided with stems that do not have any valves therein, but which depend upon a threaded cap or "choker" for closing the nipple and preventing air from escaping from the tube. The valve-plate 17, as shown in Fig. 4, is arranged so that there are openings 33 at each side thereof, and through these openings the air passes down into the annular space between the outer shell 2 and the inner flexible shell or wall 13. This causes said flexible wall to be forced against the outer surface of the nipple or stem, thereby making a tight joint between the two surfaces.

In Fig. 2 the flexible wall 13 is provided at its lower end with a flange 14, which is held in place between a rib 16 on the lower end of the shell 2 and a ring 18, that is placed over said flange 14. A screw-ring 20 screws over the end of the shell 2 and clamps the flange 14 between the ring 18 and the flange 16. In this instance the upper end of the wall 13 is free and is held by pressure against the outer surface of the stem or nipple. In the construction shown in Fig. 5 the two shells are formed integrally of flexible material, but the outer shell is provided with an outer covering that is formed of cloth or other non-elastic material. In this instance the upper end of the outer shell is arranged to be secured to a nozzle, tube, hose, or other device.

In the construction shown in Figs. 6, 7, and 8 in place of the valve-plate shown in Fig. 1 I use a threaded stem 35, adapted to screw into the threaded end 9 of the pump-cylinder. The two shells are formed integrally, and the center one is covered with a covering of cloth, canvas, leather, or other non-elastic material. The upper end of the inner wall or shell 13 is secured to the lower end of the stem 35, as shown in Fig. 7, and the upper end of the outer shell is secured to the lower end of the ring or tube 7, that is secured to said stem 35. Openings 41 are formed in the wall of the stem 35, opening into the space within said ring 7, so that the air may pass from the inside of said stem 35 into the annular space between the two shells 2 and 13, as indicated in Fig. 7.

As shown in Figs. 1, 3, 6, and 7, I prefer to form the lower end of the shell 13, which forms the bottom of the annular space between the two shells, of greater thickness than the main part for the purpose of strengthening this part of the shell and causing it to withstand a sufficient pressure within the annular space between the two shells to form an air-tight joint between the outer surface of the nipple or stem and the inner surface of the clamping shell or wall 13.

In the construction shown in Figs. 1, 3, and 7 the upper end of the inner or elastic wall 13 being screwed to the valve plate or stem the valve below the valve-plate or the the valve in the nipple will cause sufficient pressure in the annular space to force the elastic wall against the outer surface of the nipple, so as to make an absolutely air-tight joint around the nipple.

Having thus described my invention, I claim as new and desire to secure by Letters Patent—

1. The combination, in a device of the class described, with the outer shell and the inner flexible shell, of a valve-plate secured to said outer shell and provided with openings permitting the entrance of air into the annular space between said shells, and a suitable valve arranged in said valve-plate.

2. In a device of the class described, the combination, with the outer shell 2, the inner flexible shell 13, the valve-plate 17 secured to said outer shell and provided with the chamber 25 and with the opening 31, the valve located in said chamber, and the spring for holding said valve closed openings being arranged between said valve-plate and said outer shell to permit air to pass into the annular space between said shells, for the purpose set forth.

3. The combination with a pump-barrel, within which an air-pressure may be created, provided with a discharge-orifice into which the nipple of a bicycle-tire may be inserted, of a flexible shell or packing surrounding said orifice and adapted to be held, by the pressure of the air within the pump-barrel, against the outer surface of a nipple inserted in said orifice.

4. The combination, with an air-pump barrel, of an inflexible shell formed upon or secured to said pump-barrel, and provided with an orifice into which the nipple of a bicycle-tire may be inserted, and a flexible shell or packing arranged within said shell and surrounding said orifice and adapted to be held, by pressure of the air within said shell, against the outer surface of a nipple inserted in said orifice.

5. The combination, in a device of the class described, with the outer shell, of the inner flexible shell having one end secured to said outer shell, and a suitable support to which the other end of said flexible shell is secured.

6. The combination, in a device of the class described, with the outer shell and the inner flexible shell, of a plate or brace secured to said outer shell, and forming a support for the inner end of said flexible shell.

In testimony whereof I have hereunto set my hand.

JOSEPH W. BATES.

In presence of—
A. C. PAUL,
M. E. GOOLEY.